US007475066B2

United States Patent

(12) United States Patent
Dettinger et al.
(10) Patent No.: US 7,475,066 B2
(45) Date of Patent: Jan. 6, 2009

(54) DYNAMIC DATABASE ACCESS VIA STANDARD QUERY LANGUAGE AND ABSTRACTION TECHNOLOGY

(75) Inventors: Richard D. Dettinger, Rochester, MN (US); Jeffrey W. Tenner, Rochester, MN (US)

(73) Assignee: International Business Machines Corporation, Armnok, NY (US)

( * ) Notice: Subject to any disclaimer, the term of this patent is extended or adjusted under 35 U.S.C. 154(b) by 0 days.

(21) Appl. No.: 11/847,246

(22) Filed: Aug. 29, 2007

(65) Prior Publication Data

US 2007/0294234 A1 Dec. 20, 2007

Related U.S. Application Data

(63) Continuation of application No. 10/839,486, filed on May 5, 2004, now Pat. No. 7,310,637.

(51) Int. Cl.
*G06F 7/00* (2006.01)

(52) U.S. Cl. .............................................. 707/4; 707/2

(58) Field of Classification Search .................... 707/2, 707/4, 3, 100, 101, 102
See application file for complete search history.

(56) References Cited

U.S. PATENT DOCUMENTS

| | | | | |
|---|---|---|---|---|
| 5,715,450 | A | 2/1998 | Ambrose et al. | |
| 5,734,887 | A | 3/1998 | Kingberg et al. | |
| 6,067,092 | A * | 5/2000 | Rinaldi et al. | 345/629 |
| 6,076,092 | A | 6/2000 | Goldberg et al. | |
| 6,553,368 | B2 | 4/2003 | Martin et al. | |
| 6,564,205 | B2 * | 5/2003 | Iwata et al. | 707/2 |
| 6,581,054 | B1 * | 6/2003 | Bogrett | 707/4 |
| 6,651,055 | B1 * | 11/2003 | Kilmer et al. | 707/3 |
| 6,725,227 | B1 * | 4/2004 | Li | 707/102 |
| 6,775,665 | B1 * | 8/2004 | Piersol | 707/4 |
| 6,810,395 | B1 * | 10/2004 | Bharat | 707/4 |
| 6,928,431 | B2 | 8/2005 | Dettinger et al. | |
| 6,944,614 | B1 * | 9/2005 | Ramasamy et al. | 707/4 |
| 6,954,748 | B2 | 10/2005 | Dettinger et al. | |
| 6,996,558 | B2 * | 2/2006 | Dettinger et al. | 707/4 |
| 7,024,425 | B2 | 4/2006 | Krishnaprasad et al. | |
| 7,096,229 | B2 | 8/2006 | Dettinger et al. | |
| 7,310,637 | B2 * | 12/2007 | Dettinger et al. | 707/4 |
| 2001/0049679 | A1 * | 12/2001 | Yonaitis | 707/4 |

OTHER PUBLICATIONS

Ng et al., Prefetching XML Data with Abstract Query Mining, Information Technology: Coding and Computing, 2004. Proceedings. ITCC 2004, International Conference on, vol. 2, 2004 pp. 428-432 vol. 2.*

* cited by examiner

*Primary Examiner*—Greta L Robinson
(74) *Attorney, Agent, or Firm*—Patterson & Sheridan, LLP

(57) ABSTRACT

Methods, systems, and articles of manufacture that allow saved abstract queries to be referenced from within query statements constructed using standard query languages, such as Structured Query Language (SQL), are provided.

4 Claims, 8 Drawing Sheets

FIG. 4

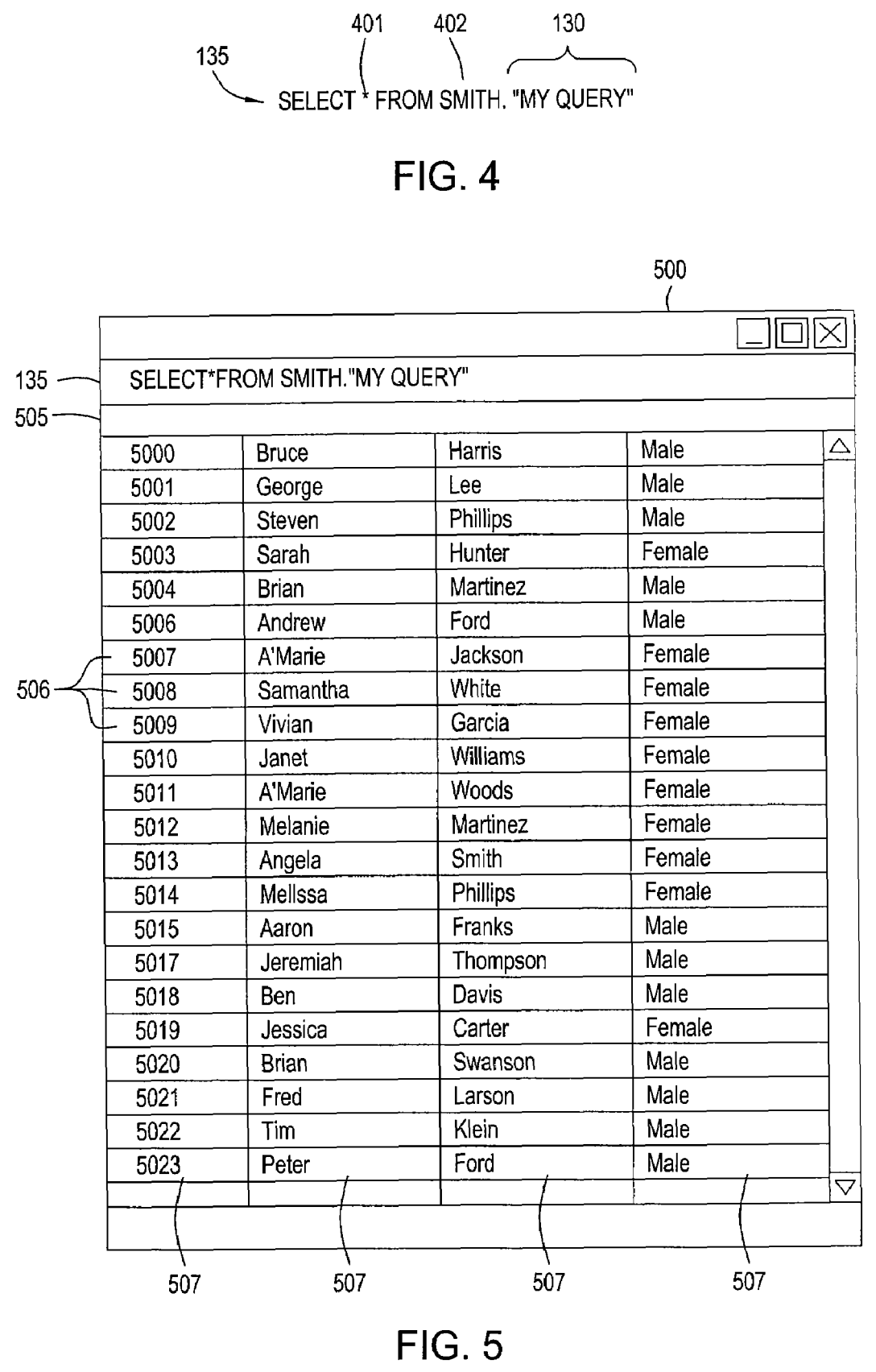

| | | | |
|---|---|---|---|
| 5000 | Bruce | Harris | Male |
| 5001 | George | Lee | Male |
| 5002 | Steven | Phillips | Male |
| 5003 | Sarah | Hunter | Female |
| 5004 | Brian | Martinez | Male |
| 5006 | Andrew | Ford | Male |
| 5007 | A'Marie | Jackson | Female |
| 5008 | Samantha | White | Female |
| 5009 | Vivian | Garcia | Female |
| 5010 | Janet | Williams | Female |
| 5011 | A'Marie | Woods | Female |
| 5012 | Melanie | Martinez | Female |
| 5013 | Angela | Smith | Female |
| 5014 | Mellssa | Phillips | Female |
| 5015 | Aaron | Franks | Male |
| 5017 | Jeremiah | Thompson | Male |
| 5018 | Ben | Davis | Male |
| 5019 | Jessica | Carter | Female |
| 5020 | Brian | Swanson | Male |
| 5021 | Fred | Larson | Male |
| 5022 | Tim | Klein | Male |
| 5023 | Peter | Ford | Male |

```
/*
Example JDBC syntax
*/

//Load driver.
      Class driver = Class.forName(*com.ibm.ddqb.api.jdbc.DDQBDriver");

// Set properties
      Properties props = new Properties();
      Props.put("UserName",username);
      props.put("Password", password);

// connect
      connection = DriverManager.getConnection("jdbc;ddqb:JDBC",props);

// create statement
      Statement statement =
        connection.createStatement(ResultSet.TYPE_SCROLL_INSENSITIVE,
                                   ResultSet.CONCUR_READ_ONLY);

// execute query
// note: Used escape syntax on quotes, but otherwise its just the SQL query
// from elsewhere.
      ResultSet r = statement.executeQuery("select*from smith.\"My Query");

while (r.next()) {
      // Standard JDBC processing of the query results.
}
```

DYNAMIC DATABASE ACCESS VIA STANDARD QUERY LANGUAGE AND ABSTRACTION TECHNOLOGY

CROSS-REFERENCE TO RELATED APPLICATIONS

This application is a continuation of U.S. patent application Ser. No. 10/839,486, filed May 5, 2004 now U.S. Pat. No. 7,310,637, which is herein incorporated by reference in its entirety.

BACKGROUND OF THE INVENTION

1. Field of the Invention

The present invention generally relates to data processing and more particularly to providing access to saved abstract queries via standard query language constructs, such as Structured Query Language (SQL) constructs.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL) and application programming interfaces (API's) such as Java® Database Connectivity (JDBC). For example, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language, such as SQL, that lets programmers and programs select, insert, update, find out the location of data, and so forth.

Unfortunately, generating queries using SQL may require a detailed understanding of the possibly complex physical layout of the underlying database and interpretation of cryptic field names. For some applications, to facilitate the query building process, an abstraction model may be utilized that, in effect, hides some of the complexities of the underlying database physical layout from users. The abstraction model may include logical fields with recognizable names that map to corresponding physical fields of the underlying database. "Abstract" queries may be generated that contain conditions based on the logical fields. Upon issuance, the logical fields of an abstract query may be mapped to corresponding physical fields to create a "concrete" query. For some applications, abstract queries may be saved, allowing subsequent users to reuse the saved abstract queries without having to generate their own. The concepts of data abstraction and abstract queries are described in detail in the commonly owned, co-pending application Ser. No. 10/083,075, entitled "Improved Application Portability And Extensibility Through Database Schema And Query Abstraction," filed Feb. 26, 2002, herein incorporated by reference in its entirety.

While abstraction models and saved abstract queries make it easier and more efficient for users to access data, use of SQL and API's such as JDBC and ODBC will likely continue to be used for at least two reasons. First, SQL is a widely used language for extracting and manipulating data residing in databases, especially relational databases. In fact, a large number of existing applications rely on SQL, JDBC and ODBC to handle database transactions from within the particular applications. Second, some users simply prefer to use SQL as a data analysis and reporting tool. SQL, while cumbersome to use, does offer a tremendous amount of functionality for manipulating and presenting data.

It would be desirable to be able to utilize this functionality in conjunction with saved abstract queries, for example, allowing those comfortable with standard query languages, such as SQL, to generate queries based on saved abstract queries. Unfortunately, as they are currently configured, standard query languages cannot be used to access saved abstract queries. Accordingly, there is a need for providing access to saved queries in query statements generated with standard query languages, such as SQL.

SUMMARY OF THE INVENTION

The present invention is generally directed to a method, article of manufacture, and system for providing access to saved queries in query statements generated with standard query languages, such as SQL.

One embodiment provides a method of gathering data from a database. The method generally includes receiving a query statement, including query constructs of a first query language format and a reference to at least one previously defined abstract query containing logical fields corresponding to physical fields of the database, obtaining the referenced abstract query, and generating a query executable against the database, based on the referenced abstract query, as modified by the first query language constructs.

Another embodiment provides a computer readable medium containing a program for automatically generating physical query statements. When executed by a processor, the program performs operations generally including receiving a query statement, the query statement including data manipulation logic in a first query language format and a reference to a previously defined abstract query containing data manipulation logic related to logical fields corresponding to physical fields of the database, merging the data manipulation logic contained in the query statement with the data manipulation logic contained in the saved abstract query, and generating a query executable against the database, based on the combined data manipulation logic.

Another embodiment provides a data processing system generally including a database, a query interface, and a query execution component. The query interface allows users to construct query statements including query constructs in a first query language format and a reference to at least one previously defined abstract query containing logical fields corresponding to physical fields of the database. The query execution component is configured to generate a query, executable against the database, based on the previously defined abstract query, as modified by the first query language constructs.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is an exemplary SQL statement appropriate for processing according to one embodiment of the invention.

FIG. 5 is a graphical user interface (GUI) screen used for presenting query results according to one embodiment of the present invention.

FIG. 6 illustrates an exemplary portion of Java® code incorporating function calls to the Java® Database Connectivity (JDBC) application programming interface (API) according to one embodiment of the invention.

DETAILED DESCRIPTION OF THE PREFERRED EMBODIMENTS

Figure 1:
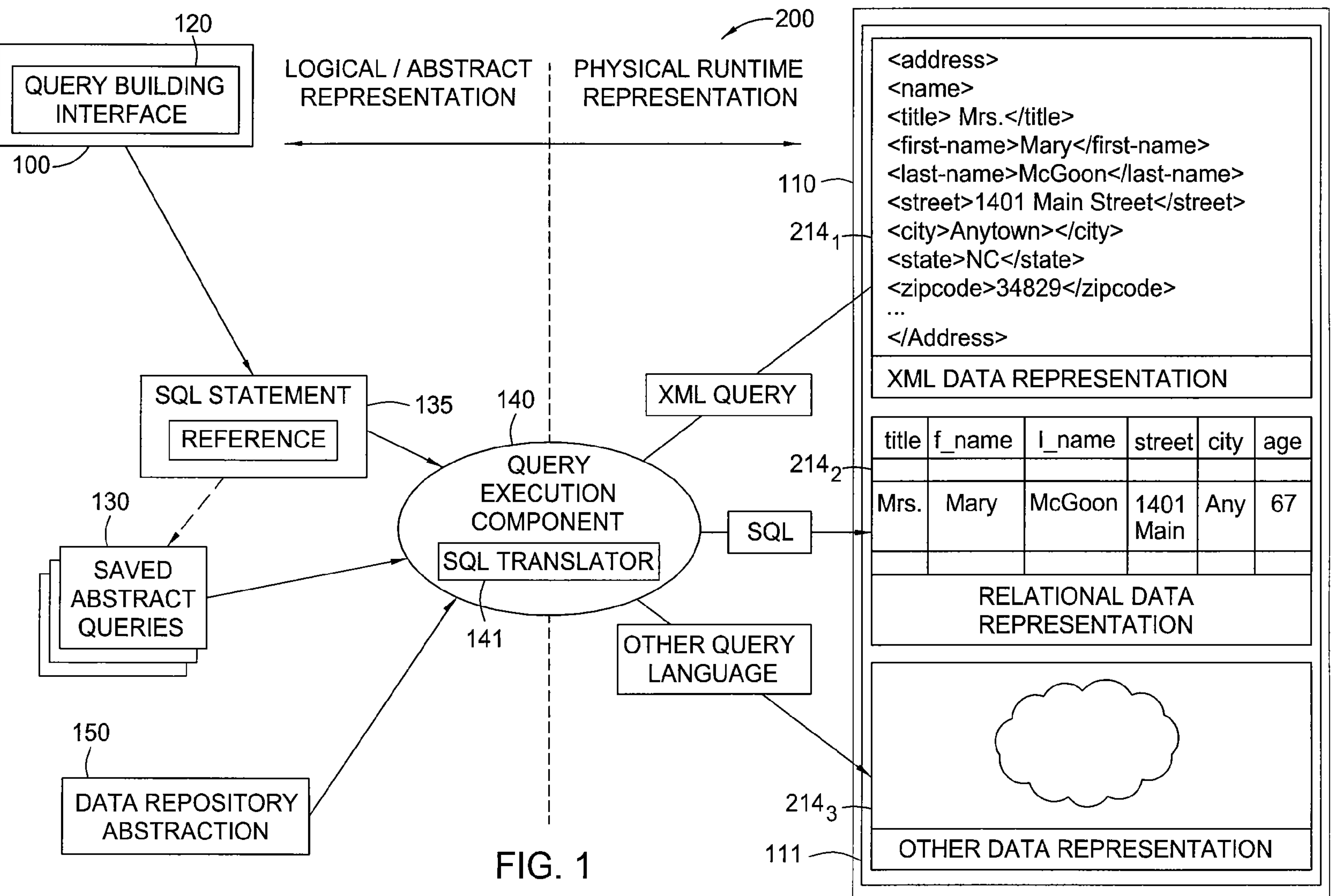
FIG. 1 is a relational view of software and hardware components of one embodiment of the invention.

Embodiments of the present invention allow saved abstract queries to be referenced from within query statements constructed using standard query languages, such as Structured Query Language (SQL). As a result, users already familiar with standard query languages may be able to easily modify a saved abstract query, using standard query constructs (e.g., SELECT, UNION, etc.) to achieve a desired result, such as returning a desired portion of the results set returned by the saved abstract query or merging results sets returned by multiple saved abstract queries.

As used herein, the term database generally refers to a collection of data arranged for ease and speed of search and retrieval. While the following description focuses on generating transaction statements for relational databases, those skilled in the art will recognize the methods described herein may be used with any type of database including an object-relational database and an XML-based database. As used herein, the term abstract query generally refers to a query having one or more conditions based on logical fields that are mapped to actual physical fields of an underlying database.

As used herein, the term user may generally apply to any entity utilizing the data processing system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

In general, embodiments of the invention can be implemented in any of a variety of hardware/software configurations. A particular embodiment includes at least one client computer and at least one server computer. The client(s) and server(s) may be executing on a common machine or may be deployed in distributed environment in which the client(s) and server(s) communicate via a network. However, the client-server model is merely one model in which the present invention may be implemented, and persons skilled in the art will recognize other possibilities. Furthermore, embodiments of the present invention can apply to any appropriate hardware configuration, regardless of whether the computer systems are complicated, multi-user computing apparatus, single-user workstations, network appliances that do not have non-volatile storage of their own or handheld devices such as personal digital assistants (PDAs), pocket PCs, and mobile telephones. Further, it is understood that while reference may be made to particular software products, the invention is not limited to a particular software product, standard or version, nor to any particular programming language. Accordingly, persons skilled in the art will recognize that the invention is adaptable to other software products and that the invention is also adaptable to future versions of a particular software product as well as to other suitable software products presently unknown.

An Exemplary System

With reference now to figures, FIG. 1 illustrates a relational view of hardware and software components of a data processing system in accordance with one embodiment of the invention. The system illustratively includes a client computer system 100 with a query building interface 120 for accessing data in a database 111, via a database management system (DBMS) 110. As illustrated, the database 111 may accommodate data in a variety of different physical representations 214, such as extensible markup language (XML) representation $\mathbf{214}_1$, relational representation $\mathbf{214}_2$, or some other data representation $\mathbf{214}_3$.

As illustrated, however, the system may include a data repository abstraction (DRA) component 150 that, in effect, shields a user from the details of the particular physical representation of the database 111. The DRA component 150 may define a set of logical fields that map to underlying physical fields of the underlying database 111. Users may be able to create abstract queries based on the logical fields, via the query building interface 120. Upon issuance of abstract queries, a query execution component 140 may convert an abstract query into a physical or "concrete" query suitable for issuance against the database 111 by mapping logical fields of the abstract query to physical fields of the particular physical representation 214, based on the field definitions in the DRA component 150. The mapping of abstract queries to physical queries, by the query execution component 140, is described in detail in the previously referenced U.S. patent application Ser. No. 10/083,075.

As illustrated, for some embodiments, one or more saved abstract queries 130 (or any other type of previously defined queries) may be available for issuance via the query building interface 140. As previously described, saved abstract queries 130 may facilitate data gathering by allowing users to re-use the saved abstract queries 130 without having to create their own queries to gather the same results.

In some cases, users familiar with conventional query languages, such as SQL, may wish to access the saved abstract queries 130 from within statements using query constructs from those conventional query languages (e.g., SELECT, FROM, UNION, etc.). For example, a user may only be interested in a limited subset of the data returned in the results set of the saved abstract query, and may wish to include one or more SQL statements to SELECT the subset of interest, or to limit the number of records returned to WHERE certain conditions are met. Accordingly, the results set returned by the saved abstract query may be treated as a separate set of data queried by the SQL statement 135. To facilitate discussion, the following examples will illustrate SQL statements that reference saved abstract queries as a particular, but not limiting, example of the types of statements that may refer to saved abstract queries in accordance with the embodiments of the present invention.

Referencing Abstract Queries from SQL Statements

Embodiments of the present invention accommodate the submission of SQL statements 135 which reference saved abstract queries 130. As will be described in greater detail below, references to saved abstract queries may be included in place of relational table identifiers. The SQL statements 135 may be generated via the query building interface 120, which may present the user with a list of available saved abstract queries 130 and allow the user to add SQL constructs.

The process of integrating SQL with abstract queries, and more particularly saved abstract queries 130 referenced in the SQL statement 135, will be described in more detail below. In one embodiment, the query execution component 140 includes an SQL translator 141 to combine logic in a SQL statement with logic in a saved abstract query 130 referenced thereby to eventually create a physical query that is executable against the database 111. For some embodiments, the query execution component 140 may first convert the saved abstract query 130 into an physical (SQL) query, which the SQL translator may then modify based on the logic in the SQL statement 135 to generate a new physical query. For other embodiments, however, a new abstract query may be generated by modifying the saved abstract query 130 based on logic in the SQL statement 135 that references it.

Figure 2:
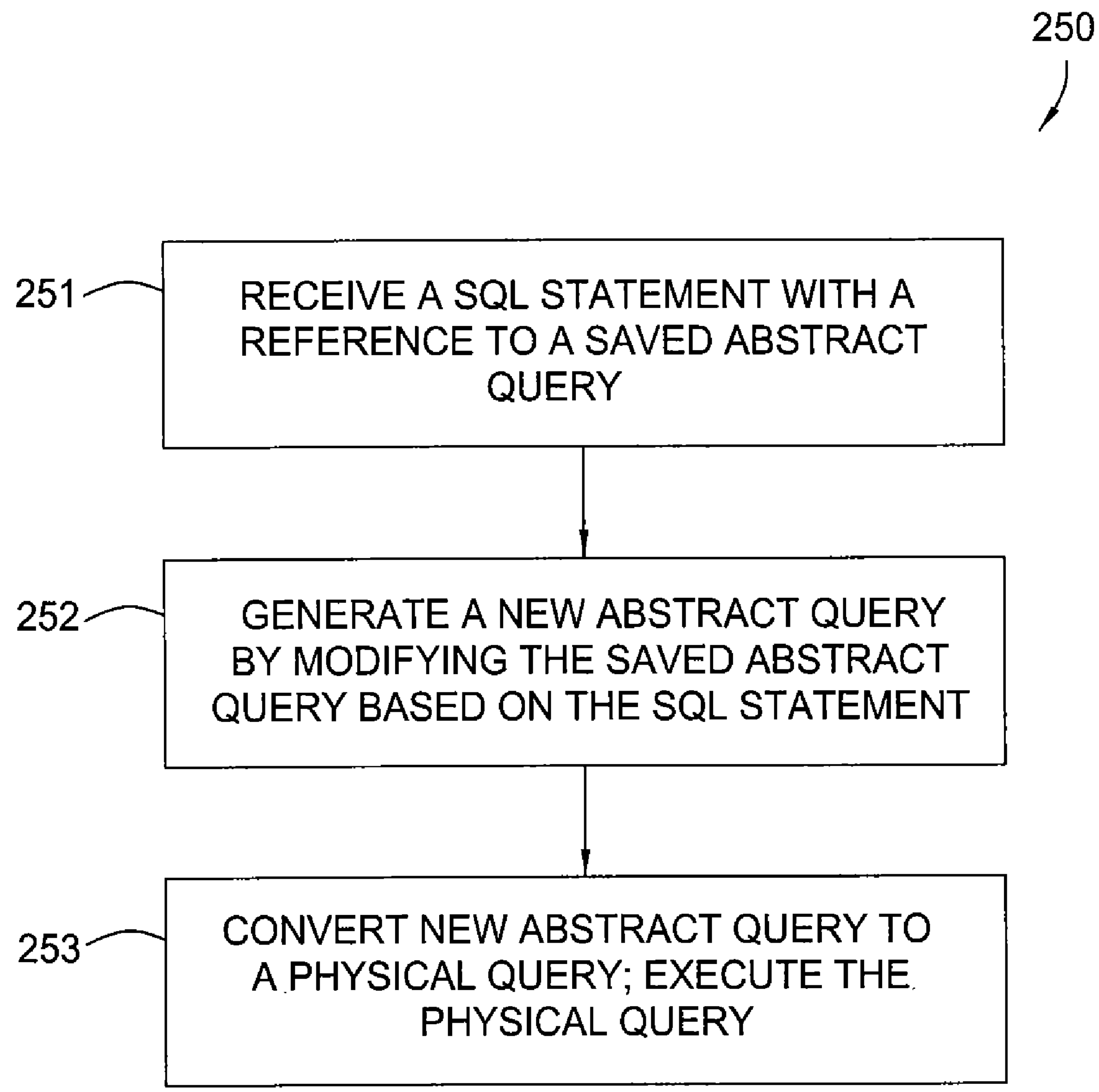
FIG. 2 is a flow diagram of exemplary operations for the creation of a physical query according to one embodiment of the invention.

FIG. 2 is a flow diagram of exemplary operations 250, that may be performed by the query execution component 140 and SQL translator 141, for example, to transform an SQL statement 135 into a physical query that can be submitted to the database 111. The operations 250 may be described with simultaneous reference to FIG. 2 and FIG. 3, which illustrates the creation of a physical query based on a SQL statement 135 containing a reference to a saved abstract query 130.

Operations 250 begin at step 251 when an SQL statement 135 (a database transaction statement) referencing a saved abstract query 130 is received. For example, the query execution component may receive the SQL statement 135 from a user application, from which the SQL statement 135 may have been generated via the query building interface 120.

Figure 3:
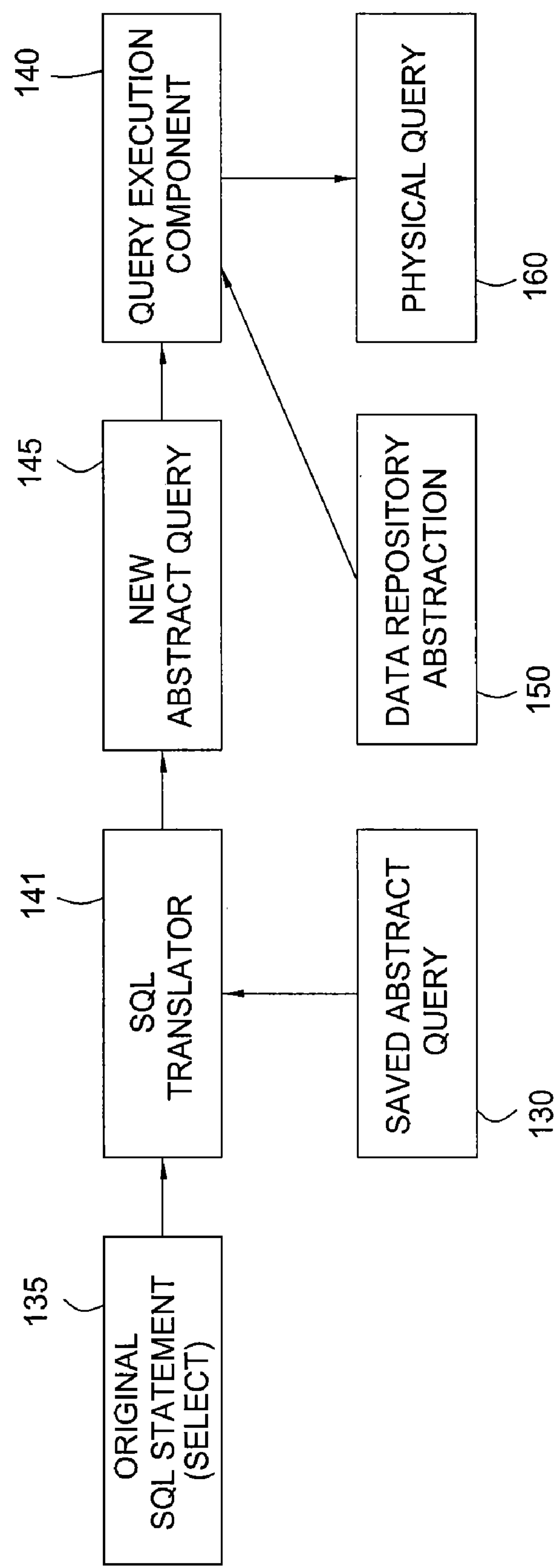
FIG. 3 illustrates the creation of a physical query based on an SQL statement containing a reference to a saved abstract query.

At step 252, a new abstract query is generated by modifying the saved abstract query 130 based on (logical constructs in) the SQL statement 135. As illustrated in FIG. 3, the SQL translator 141 may generate the new abstract query 145 and pass it on to the query execution component 140 for issuance. In generating the new abstract query 145, the SQL translator may perform any suitable processing functions, such as parsing the SQL statement 135, accessing the saved abstract query 130, and modifying the saved abstract query 130 accordingly for example, based on a set of translation rules.

At step 253, the query execution component 140 converts the new abstract query 145 into a physical query 160 and executes it against the database. As previously described, the query execution component 140 may generate the physical query 160 by converting logical fields contained in the new abstract query 145 into corresponding physical fields of the database 111, based on logical field definitions in the data repository abstraction component 150.

An Exemplary SQL Statement Referencing an Abstract Query

FIG. 4 illustrates one example of an SQL statement 135 containing a reference to a saved abstract query 130. It should be noted that, as shown, the SQL statement 135 cannot be submitted to the query execution component 140 for execution without some processing by the SQL query translator 141. This is because the query execution component 140 is designed to handle abstract queries such as the saved abstract queries 130, not SQL queries comprising standard constructs (e.g., SELECT and FROM) intermingled with the reference to the abstract queries 130. Further, the SQL statement 135, as shown, cannot be submitted directly to the database 111 because the DBMS 110 will not be able to accommodate the identifiers that are in place of the schema and object name (schema.table). The DBMS may not be able to directly access the saved abstract queries 130 (smith."My Query"), and it may not be able to treat the saved abstract queries 130 as generic database tables or views, for example.

However, The SQL statement of FIG. 4 can be processed by embodiments of the present invention. Among other functionality, embodiments of the present invention provide facilities to allow users to submit SQL queries against results sets returned from issuing saved abstract queries 130 as if they were standard tables (comprising one or more columns and rows) residing in a relational database.

Those skilled in the art will recognize that the expression "*" 401 between the SELECT and FROM keywords denotes all the columns of the saved abstract query 130 being selected from. The reference to the saved abstract query 130, in effect, represents a collection of data that is a results set returned from issuing the referenced save abstract query 130. In other words, references to saved abstract queries 130 may be thought of as references to queryable data sources, such as relational tables or other objects.

As shown, the SQL statement 135 is querying a saved abstract query 130, "My Query", owned by a particular account 402, SMITH. It should be noted that If the statement that is illustrated was a standard SQL statement (i.e., directed to relational tables), the term "SMITH" 402 would denote the schema owner (or account) and the term "My Query" 403 would denote the referenced table that is owned by the schema owner. Conceptually, this query represents the following: select all the rows from "MY Query". The rows returned should include values for all columns that make up "MY Query".

FIG. 5 illustrates a GUI window that is used to present the results of the SQL statement 135 of FIG. 4. The SQL statement 135 is presented along the top of the window. A table of results 505 corresponding to the query defined by the SQL statement 135 is also presented. The table 505 comprises multiple records 506 and columns 507 corresponding to the data represented by the saved query 130 referred to as smith."My Query".

It should be noted that while the examples described herein are SQL based, other embodiments of the present invention may accommodate other well known programming languages such as Java®. It is well known that the JDBC API is used to interface Java® program modules to databases. FIG. 6 illustrates exemplary code utilizing Java® and JDBC according to one embodiment of the present invention.

The top portion 601 of the sample code presented in FIG. 6 is used to prepare and enable a program (and the session in which it is running) for managing database transactions. Preparatory steps may include loading required drivers, setting appropriate property values, opening and maintaining a connection to the database management system, and selecting an appropriate template (or class) for managing a query and its results set. The portion of code labeled 602 is a segment of code where the SQL statement 135 is being submitted via a component of the JDBC API. The results set returned by the DBMS 110 is handled by the section of code marked 603.

While the SQL statements discussed up to this point have been relatively simple (i.e., involving a simple SELECT . . . FROM statement), it should be understood that more complex SQL statements, such as any statements that abide by the American National Standards Institute (ANSI) SQL standards, may also be accommodated by embodiments of the present invention. Even though saved abstract queries 130 and data repository abstraction components 150 are generally designed to simplify access to the physical data and spare the user from having to use SQL to extract and present data in a preferred manner, embodiments of the present invention allow for the leveraging of the rich functionality offered by SQL to further process data available via saved queries 130.

For instance, SQL may allow users to work with data at the logical level. For example, to retrieve a set of rows from a table (or saved abstract query 130 according to embodiments of the present invention), users may define a condition to filter out certain rows that do not meet specified conditions. All rows satisfying the conditions are retrieved in a single step and can be passed as a unit to the user, to another SQL statement, or to an application. Users need not deal with the rows one by one, nor do they have to worry about how data is physically stored or retrieved, as this is handled by the referenced saved abstract query 130 and mappings defined by the DRA component 150. SQL and API interfacing functionality provided by embodiments of the present invention also allow a large user base that is comfortable using SQL and, in some cases, prefer using SQL to work with saved abstract queries 130.

Another reason users may prefer to use SQL is the abundance of tools available in the marketplace that can be used to generate SQL statements. By supporting SQL directly, and providing access to the metadata of saved abstract queries 130 via standard SQL/ODBC/JDBC means, these SQL generation tools may be used to build query statements (referencing abstract queries) that can be handled by embodiments of the current invention.

Various examples of SQL statements that may be handled by embodiments of the present invention are presented in Tables I, II and III below. The SQL statement illustrated in Table I below is slightly more complex than the ones discussed thus far. This particular example further demonstrates how an SQL statement 135 can also be used to extract a subset of data from a saved abstract query 130. For example, the SQL statement shown in TABLE 1 below specifies that the results set include only the "PATIENT ID" and "Age" columns from the data abstraction component (owned by SMITH) called "Patients with Breast Cancer". In contrast, the SQL statement above specifies that only a subset of data available in the saved query called "Patients with Breast Cancer" be retrieved.

TABLE I

| BASIC QUERY EXAMPLE | |
|---|---|
| 001 | SELECT "Patient ID", "Age" |
| 002 | FROM SMITH."Patients with Breast Cancer" |

Users that are knowledgeable and experienced with SQL can also develop some complex queries using a wide variety of constructs including OUTER JOINS and UNIONS, as long as the SQL translator 141 supports such contsructs. For instance, the SQL statement illustrated in TABLE II below utilizes a LEFT OUTER JOIN:

TABLE II

| COMPLEX QUERY EXAMPLE | |
|---|---|
| 001 | SELECT "Patient ID", "Age" |
| 002 | FROM SMITH."Patients with Breast Cancer" x |
| 003 | LEFT OUTER JOIN SMITH."Patients with Lung Cancer" y |
| 002 | ON (x."Patient ID" = y."Patient ID"); |

Persons skilled in the art will recognize that the exemplary query above logically joins two saved abstract queries in exactly the same manner that such a SQL statement would join two relational tables. The join is based on the "Patient ID" field that appears in both of the referenced saved abstract queries.

TABLE III

| ANOTHER COMPLEX QUERY EXAMPLE | |
|---|---|
| 001 | SELECT "Patient ID", "Age" from SMITH."Patients with Breast Cancer" |
| 002 | UNION |
| 003 | SELECT "Patient ID", "Age" from SMITH."Patients with Bone Cancer" |

Table III, shown above, illustrates yet another example of a complex query. This particular SQL statement employs the well known UNION construct. Those skilled in the art will understand that a SQL statement employing one UNION is actually a combination of two SQL statements. Accordingly, a SQL statement that includes the UNION construct twice is a combination of three SQL statements. In other words, the UNION construct acts as a link between SQL statements. As the term UNION implies, the result sets of the separate SQL statements are combined before being presented to users. This particular SQL statement will be described in further detail with reference to FIG. 7.

Figure 7:
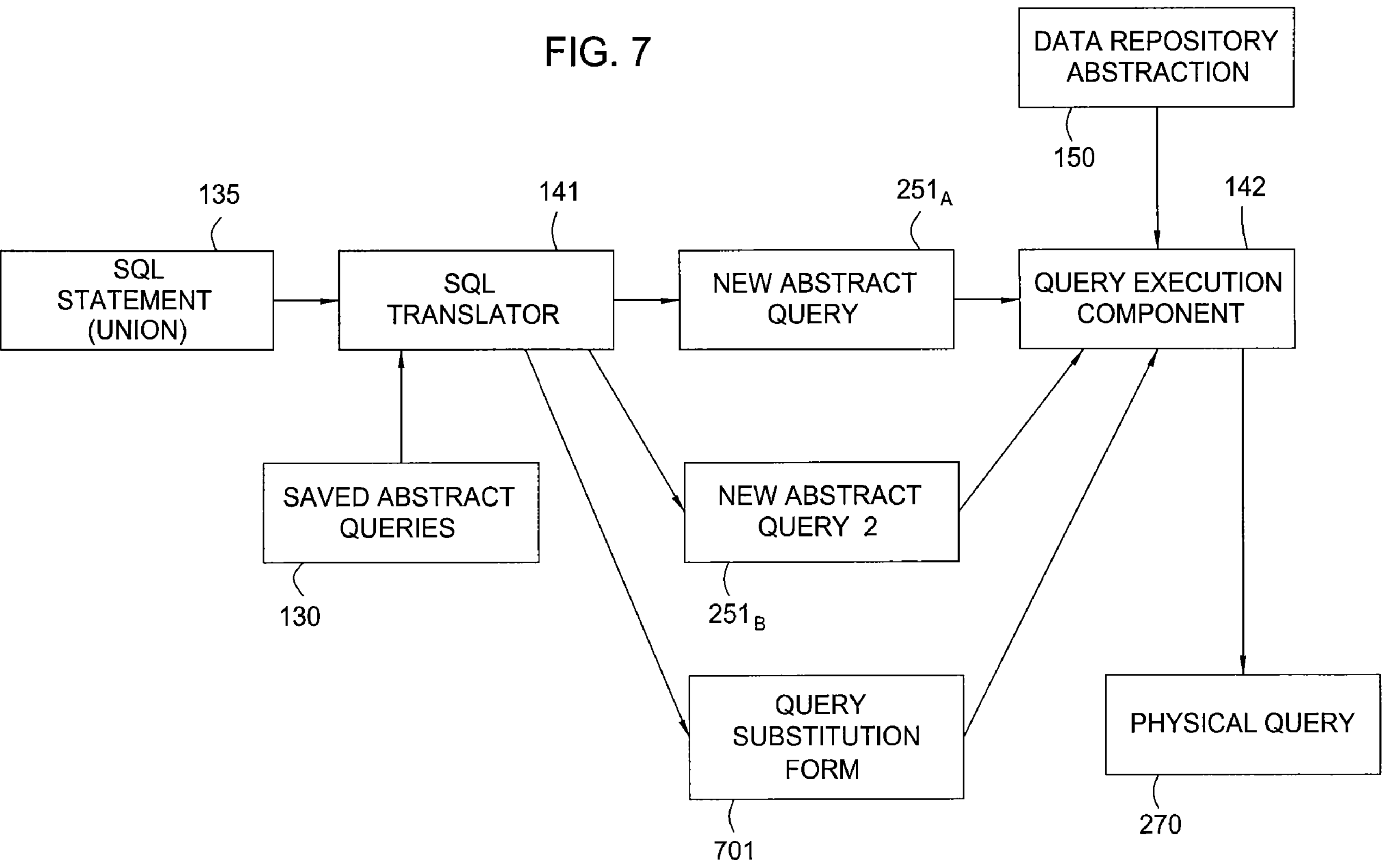
FIG. 7 illustrates the creation of a physical query based on an SQL statement (employing the UNION construct) containing references to multiple abstract queries.

Just as FIG. 3 illustrated the creation of a physical query based on a SQL statement (SELECT * FROM SMITH."My Query"), FIG. 7 illustrates the creation of a physical query based on the SQL statement of TABLE III. Again, FIG. 3 illustrates the creation of a physical query based on a simple SELECT statement, which simply reads all data contained by the referenced saved abstract query. In contrast, the SQL statement of TABLE III is structurally very different from the statement described with reference to FIG. 3. For instance, the statement of Table III can be separated into two separate SQL statements: 1) SELECT "Patient ID", "Age" from SMITH."Patients with Breast Cancer" and 2) SELECT "Patient ID", "Age" from SMITH."Patients with Bone Cancer".

As illustrated in FIG. 7, the SQL translator 141 generates two new abstract queries ($\mathbf{251}_A$ and $\mathbf{251}_B$), corresponding to the two separate SQL statements (components of the UNION statement) shown above. The SQL translator 141 may also generate a query substitution form 701, which provides simplified representation of the input SQL statement with the queries removed. The query substitution form 701 is used to track what the actual statement will finally look like. In the case of the UNION statement of the current example, the query substitution form 601 may look like <q1>UNION <q2 >. The query execution component 140 may then convert the new abstract queries into physical queries (e.g., q1 and q2) based on mappings in the data repository abstraction component 150 and combine the queries as indicated in the query substitution form 701 to produce a new physical query 270.

An Exemplary Query Building Graphical User Interface

Figure 8:
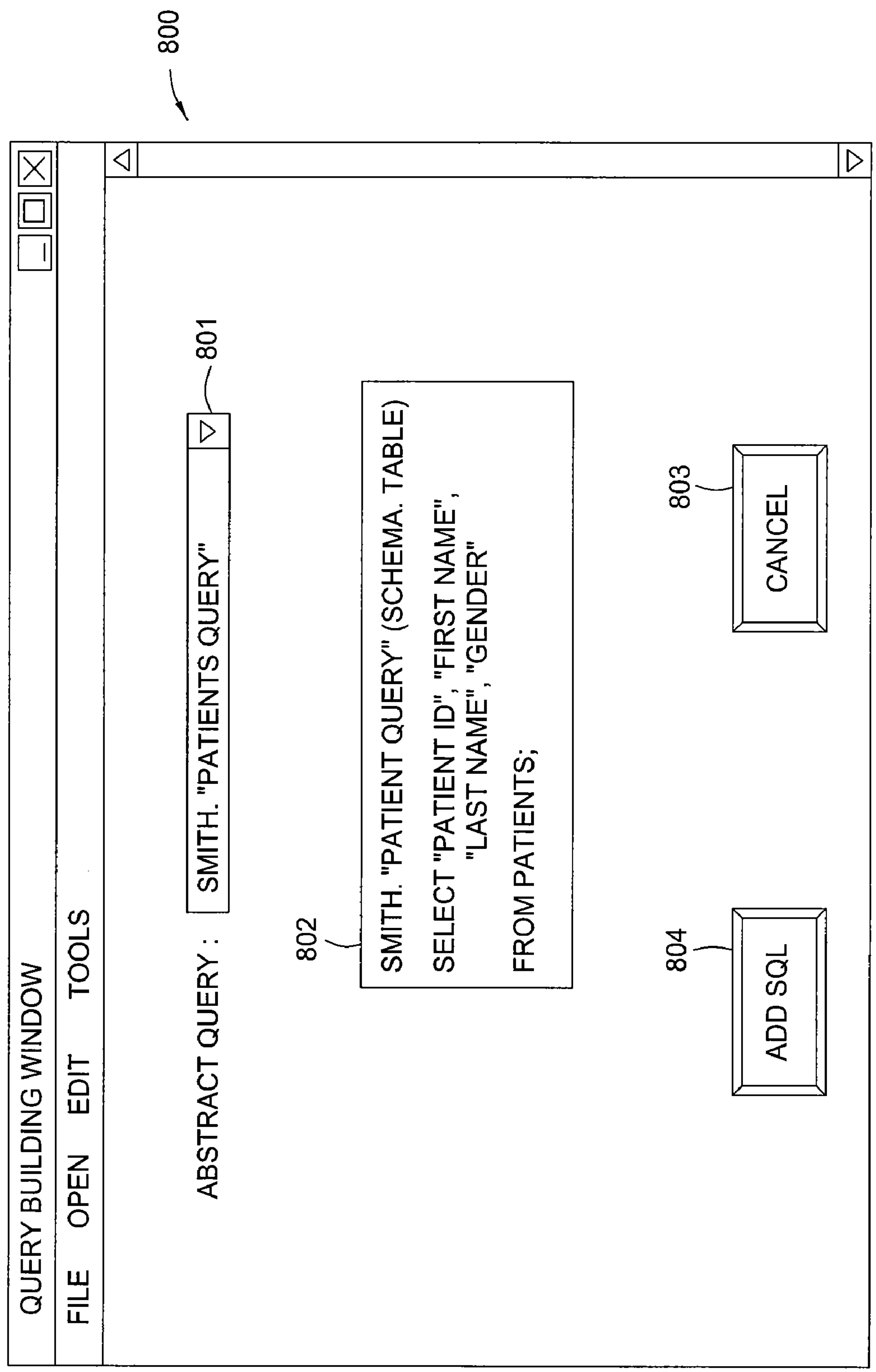
FIGS. 8 and 9 are graphical user interface (GUI) screens for creating and submitting SQL statements with references to saved queries according to one embodiment of the invention.

FIG. 8 illustrates an exemplary query building window 800 that may be used to create SQL statements that reference saved abstract queries 130 according to one embodiment of the present invention. For example, the window 800 may be part of the query building interface 120 described with reference to FIG. 1. An abstract query drop down 801 is provided to allow users to select from a list of available saved abstract queries 130.

Figure 9:
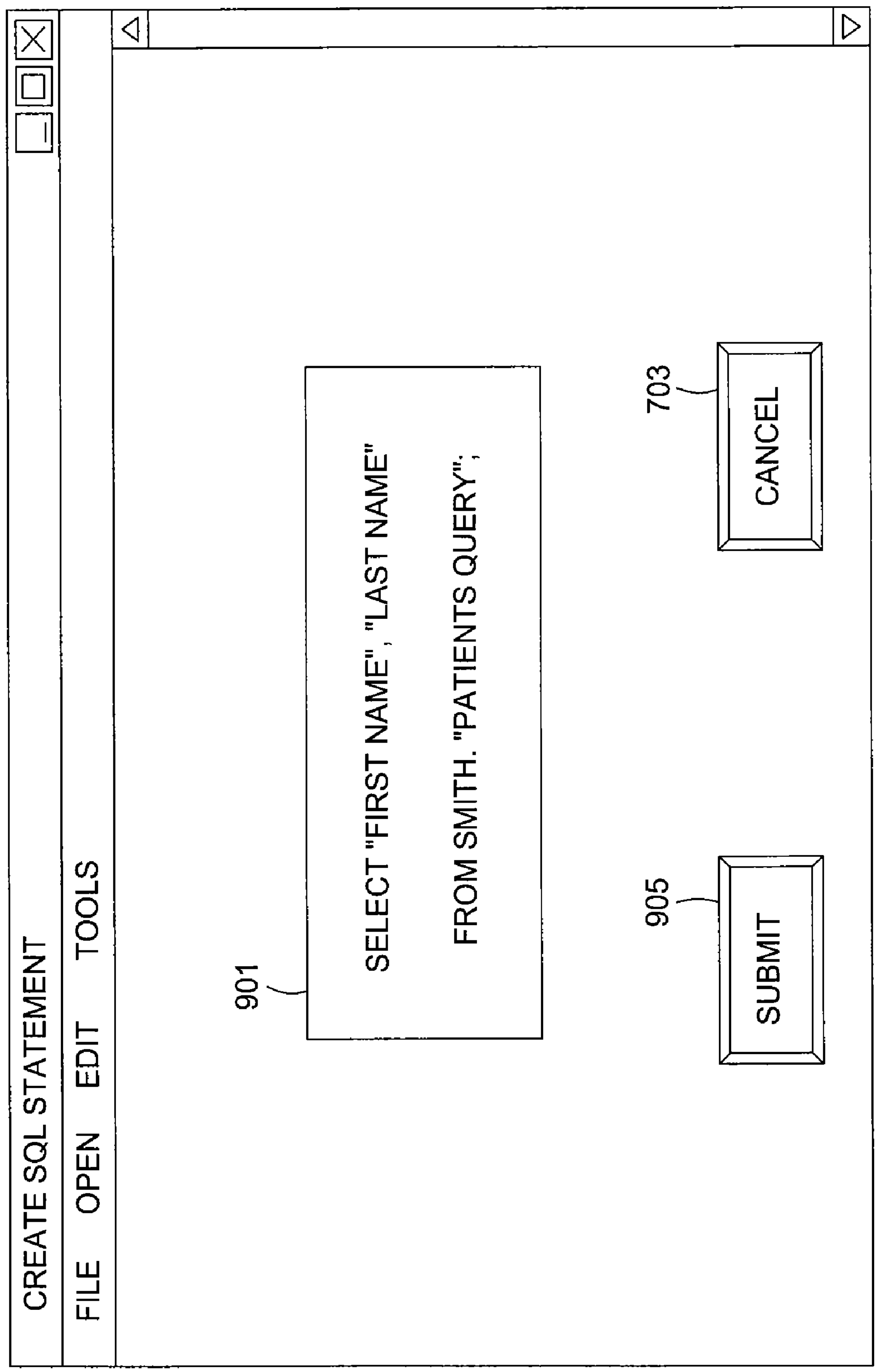

If the user chooses to create a SQL statement that references the selected saved abstract query 130 (via the drop down 801 ), the ADD SQL button 803 can be pushed to launch a CREATE SQL STATEMENT window 900 illustrated in FIG. 9. The selected saved abstract query 130 from FIG. 8 may be presented in the window 900 within an editable free-form text box 901 that allows users to create SQL statements that reference saved abstract queries 130. It should be understood that this type of screen is useful for users that have a reasonable understanding of SQL concepts and are able to write functional SQL syntax. Once the user is satisfied with the newly created SQL, the statement can be submitted to the query execution component 140 according to operations described above.

Referring back to FIG. 8, a query review box 802 is provided to allow users to review syntax of the selected saved abstract query 130. Users experienced with SQL may be able to determine the data represented by the saved abstract query 130 by reviewing the syntax. In some cases, created SQL statements may also be saved for later reuse. Further, in some cases, the new abstract query generated from the SQL statements may be saved as a new query. Options for saving SQL statements or new abstract queries based on them may be provided via windows 800 or 900.

CONCLUSION

Allowing saved abstract queries to be accessed via standard query language statements, such as SQL statements, may allow users familiar (and/or comfortable) with those languages to take advantage of previously saved abstract queries, which may result in increased efficiency. For example, rather than create a complicated query from scratch, a user may be able to generate a "hybrid" statement that refers to a saved abstract queries that already returns data of interest. The hybrid statement may, however, allow the user to drill down to receive particular data of interest, however, without detailed knowledge of the physical representation of an underlying database holding the data.

While the foregoing is directed to embodiments of the present invention, other and further embodiments of the present invention may be devised without departing from the basic scope thereof, and the scope thereof is determined by the claims that follow.

What is claimed is:

1. A data processing system comprising:

a database:

a query interface allowing users to construct query statements including query constructs in a first query language format and a reference to at least one previously defined abstract query containing logical fields corresponding to physical fields of the database; and a query execution component configured to generate a query, executable against the database, based on the previously defined abstract query, as modified by the query constructs in the first query language format; and wherein the query execution component is configured to receive query results corresponding to the executed executable query; wherein the query execution component is configured to generate the executable query by generating a new abstract query based on the previously defined abstract query and the query constructs.

2. The data processing system of claim 1, wherein the executable component is configured to generate the executable query by mapping logical fields of the new abstract to physical fields of the database.

3. A data processing system comprising:

a database;

a query interface allowing users to construct query statements including query constructs in a first query language format and a reference to at least one previously defined abstract query containing logical fields corresponding to physical fields of the database; and a query execution component configured to generate a query, executable against the database, based on the previously defined abstract query, as modified by the query constructs in the first query language format; and wherein the query execution component is confiqured to receive query results corresponding to the executed executable query; wherein the interface presents users with a list of available previously defined abstract queries.

4. The data processing system of claim 3, wherein the interface allows users to enter query constructs in the first query language format in a text box.

* * * * *